(12) United States Patent
Bytnar

(10) Patent No.: US 7,632,421 B2
(45) Date of Patent: Dec. 15, 2009

(54) LOW VISCOSITY DE-ICING COMPOSITIONS

(75) Inventor: Stephen C. Bytnar, Greeley, CO (US)

(73) Assignee: Envirotech Services, Inc., Greeley, CO (US)

( * ) Notice: Subject to any disclaimer, the term of this patent is extended or adjusted under 35 U.S.C. 154(b) by 0 days.

(21) Appl. No.: 11/338,135

(22) Filed: Jan. 23, 2006

(65) Prior Publication Data

US 2006/0175574 A1    Aug. 10, 2006

Related U.S. Application Data

(60) Provisional application No. 60/650,821, filed on Feb. 7, 2005.

(51) Int. Cl.
*C09K 3/18* (2006.01)
(52) U.S. Cl. .......................... 252/70; 106/13
(58) Field of Classification Search .............. 106/13; 252/70
See application file for complete search history.

(56) References Cited

U.S. PATENT DOCUMENTS

| | | | | |
|---|---|---|---|---|
| 2,101,472 | A * | 12/1937 | Kormann | 106/13 |
| 2,373,727 | A * | 4/1945 | Longhurst et al. | 106/13 |
| 4,426,409 | A | 1/1984 | Roe | |
| 5,135,674 | A * | 8/1992 | Kuhajek et al. | 252/70 |
| 5,302,307 | A * | 4/1994 | Ireland | 252/70 |
| 5,427,705 | A | 6/1995 | Simper | |
| 5,591,375 | A | 1/1997 | Lott et al. | |
| 5,595,679 | A * | 1/1997 | Zaid | 252/70 |
| 5,635,101 | A * | 6/1997 | Janke et al. | 252/70 |
| 5,849,356 | A | 12/1998 | Gambino et al. | |
| 6,080,330 | A | 6/2000 | Bloomer | |
| 6,299,793 | B1 * | 10/2001 | Hartley et al. | 252/70 |
| 6,468,442 | B2 | 10/2002 | Bytnar | |
| 6,596,188 | B1 | 7/2003 | Hartley et al. | |
| 6,599,440 | B2 * | 7/2003 | Hartley et al. | 252/70 |
| 6,770,217 | B2 * | 8/2004 | Hartley et al. | 252/70 |
| 6,827,873 | B2 * | 12/2004 | Hartley et al. | 252/70 |
| 6,852,247 | B2 * | 2/2005 | Bytnar | 252/70 |
| 6,861,009 | B1 | 3/2005 | Leist | |
| 7,045,076 | B2 * | 5/2006 | Hartley et al. | 252/70 |
| 2004/0092407 | A1 | 5/2004 | Cotter et al. | |
| 2005/0023502 | A1 | 2/2005 | Hartley et al. | |

FOREIGN PATENT DOCUMENTS

| GB | 2001095 A * | 1/1979 |
|---|---|---|
| WO | WO 2005/007279 A2 | 1/2005 |

OTHER PUBLICATIONS

Derwent Abstract Accession No. 96-076173/08, and NL 1000231 C (BAKK) Aug. 7, 1995, abstract.

* cited by examiner

*Primary Examiner*—Anthony J Green
(74) *Attorney, Agent, or Firm*—Townsend and Townsend and Crew LLP

(57) ABSTRACT

A composition to reduce ice buildup on a surface, the composition that includes salt, water, and starch, where the composition has a viscosity of about 60 centipoise or less at 0° F. Also, a composition to enhance deicing capabilities on a roadway, where the composition includes about 10% to about 98%, by weight, water; less than 0.5%, by weight, starch; and about 5% to about 90%, by weight, salt. In addition, a deicing composition that includes salt, water, and gelatin, where the composition has a viscosity of about 60 centipoise or less at 0° F.

15 Claims, 1 Drawing Sheet

LOW VISCOSITY DE-ICING COMPOSITIONS

CROSS-REFERENCES TO RELATED APPLICATIONS

This application claims the benefit of U.S. Provisional Application No. 60/650,821, filed Feb. 7, 2005, which is incorporated herein by reference in its entirety.

FIELD OF THE INVENTION

Embodiments of the invention relate to de-icing compositions for preventing the formation and reducing the buildup of ice on roads and other outdoor surfaces. More particularly, this invention relates to environmentally friendly de-icing compositions containing starch or gelatin, which have low viscosity.

BACKGROUND OF THE INVENTION

Salt has been used for many years to control the formation and accumulation of snow and ice on roads. Salts such as sodium chloride and magnesium chloride are spread onto roads either as solids (e.g., rock salt) or aqueous brine solutions, to lower the freezing point of the water on the roads. Sand, gravel and other abrasives are also placed on roads to increase the coefficient of friction between the road and the vehicles tires. Unfortunately, both salt and abrasives can cause signification damage to the environment and property.

The salt dumped on the roads can have an adverse impact on adjacent vegetation. In ecologically fragile areas, such as freshwater lakes and wetlands, salt migration from the roads can be particularly damaging to the surrounding flora and fauna. In addition, the salt can have corrosive effects on vehicles, causing rust and corrosion on vehicle paneling, chassis, exhaust systems, etc. The cumulative environmental and economic impact of these problems has caused many states to limit the use of salt on roads.

Similarly, sand and gravel can cause significant property damage when particulates kicked up by fast moving vehicles can dent vehicle paneling and crack vehicle windshields. In addition, loose particulates remaining on a road can reduce the coefficient of friction and create a vehicle slipping or skidding hazard. As a result, many states and regions restrict or prohibit the use of sand and gravel on roads, even when ice and snow are present.

More recently, mixtures of salt and carbohydrates have been introduced to control ice formation on roads. These mixtures significantly reduce the amount of salt needed for the mixture to provide useful lowering of melting points for road ice and snow. The reduced salt content lowers the environmental and economic damage caused by the mixtures.

The carbohydrates used have included sugars, such as monosaccharides like dextrose, maltose, malt-triose, as well as larger, more complex oligosaccharides and polysaccharides. Unfortunately, the large amounts of sugars used in these compositions (e.g., typically more than 5%, by weight, of the mixture) makes the mixtures expensive. In addition, may of the salt and sugar mixtures do not lower the freezing point to the desired temperature. The mixtures may also contain high levels of insoluble materials, making it more difficult to mix them into a liquid de-icing composition. Some of the materials used, such as phosphate modified carbohydrates, may also have an adverse environmental impact.

Still more recent de-icing compositions have included mixtures of salts and larger carbohydrates, such as starches. In these mixtures, the starch component is used to increase the viscosity of the solution to keep the salt component close to the surface of a road. Typically, these salt and starch mixtures typically contain more than 6%, by weight, of starch to ensure a high viscosity. Unfortunately, the large quantity of starch required makes these mixtures expensive to manufacture and use. In addition, the high viscosities of these mixtures can dramatically reduce the friction coefficient of the road, creating a dangerous slipping and skidding hazard for vehicles. Thus, there remains a need for non-hazardous, environmentally friendly, and economically viable compositions to prevent the formation and buildup of ice and snow on roadways.

BRIEF SUMMARY OF THE INVENTION

Embodiments of the invention relate to compositions to reduce ice buildup on a surface. The composition may include salt, water, and starch, where the composition has a viscosity of about 60 centipoise or less at 0° F.

Embodiments of the invention also relate to compositions to enhance deicing capabilities on a roadway. The compositions may include about 10% to about 98%, by weight, water, less than 0.5%, by weight, starch, and about 5% to about 90%, by weight, salt.

Embodiments of the invention may also relate to deicing compositions that include salt, water, and gelatin, where the composition has a viscosity of about 60 centipoise or less at 0° F. In some embodiments, the gelatin concentration may be about 0.5%, by weight, or less.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

A. General Overview

Figure 1:
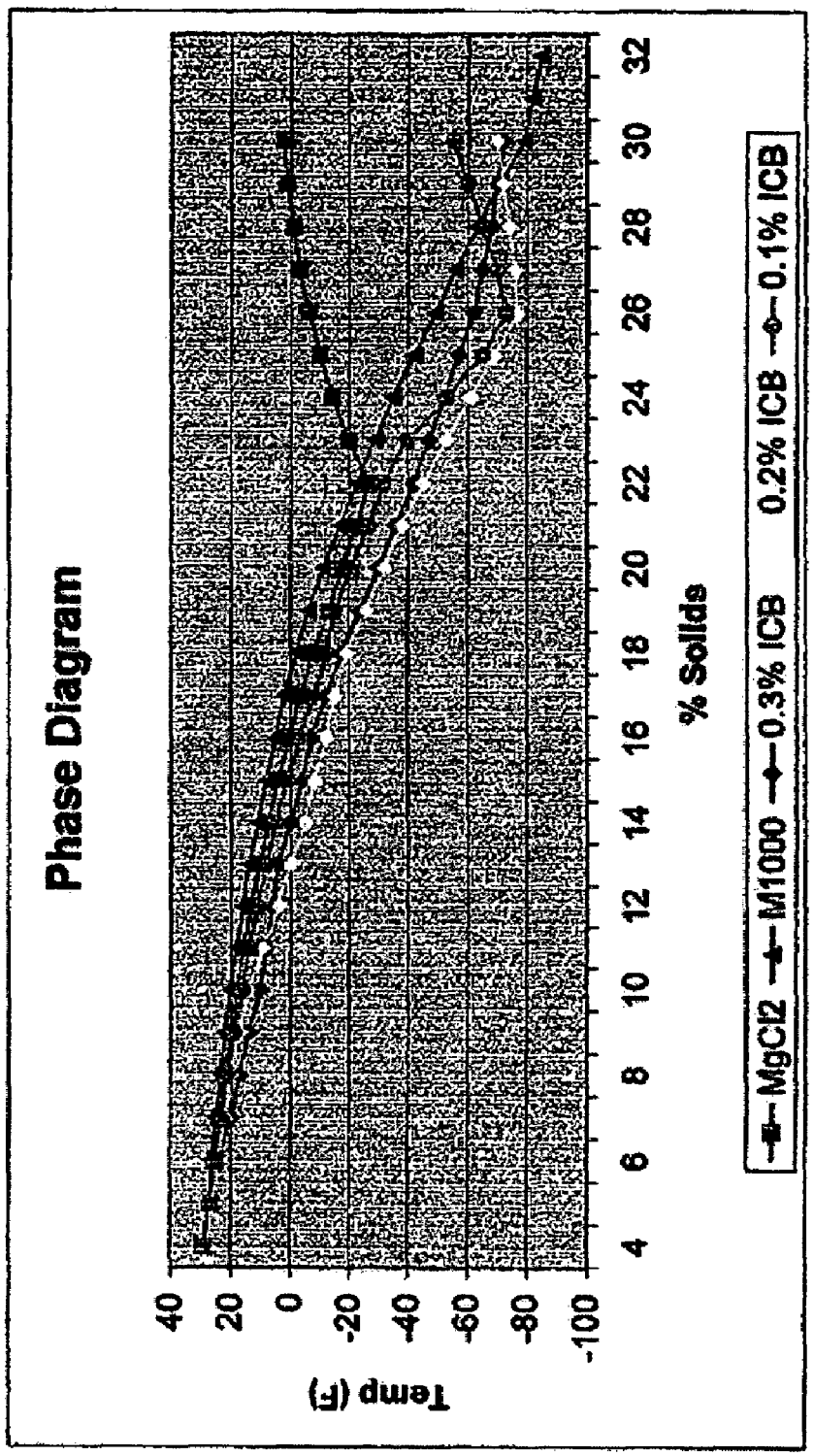
FIG. 1 shows a plot of freezing points for various de-icing compositions.

According to an embodiment the invention, it has been discovered that low viscosity, economical, and environmentally benign de-icing compositions may be made from salt, starch (and/or gelatin) and water. The low viscosity of the compositions may be achieved by limiting the concentration of starch. Surprisingly, it has been discovered that controlling the starch concentration can enhance, rather than harm, the freezing point depression of the compositions.

B. Starch

The starch used in the present compositions may include unbranched starches, such as amylose, which is made up of glucose residues having $\alpha$-1,4 glycoside linkages, and branched starches, such as amylopectin, which has an $\alpha$-1,6 linkage at about every 30 of the $\alpha$-1,4 linkages. The starch may also include combinations of branched and unbranched starches. The starch may be derived from a variety of natural products, including wheat, corn, barley, sorghum, potato, rice, and tapioca, among other sources.

Starch may also include modified starches, such as starched-based polymers, cross-linked starches, substituted starches, phosphated starches, oxidized starches, acid-thinned starches, as well as other starch derivates. Starch-based polymers may include reaction polyols derived from the catalytic reaction of a starch with dibasic acids and hydrogen-donating compounds dissolved in a water based slurry. The slurry may be subject to high temperatures and pressures to yield the polymer in aqueous solution. Molecular rearrangements that take place during the reaction can give the polymers a substantially reconfigured structure compared with the starting starch reagent. The polymers may also be further reacted with acids, bases, and cross-linking agents.

The starch used may be commercially available an include any kind of commercially used starch, such as commercial starch, powdered starch, pearl starch, laundry starch, technical starch, and edible starch, among others. Additional descriptions of starches that may be used with the present compositions are described in U.S. Pat. No. 5,849,356 to Gambino et al, the entire contents of which are hereby incorporated by reference for all purposes.

The starch may also be combined with, or substituted by, a gelatin. Gelatins include protein derived compositions made through partial hydrolysis of the collagen extracted from skin, bones, cartilage, ligaments, and other types of connective tissue. The natural molecular bonds between individual collagen strands are broken down into a form that rearranges more easily. Gelatins melt when heated, and solidify when cooled again. In water they may form a semi-solid colloidal gel.

C. Salt

Salt may include ionically bonded alkali metal and alkali earth metal cations with calcogenide or halide anions. Salt may include a variety of chloride salts, such as sodium chloride, calcium chloride, magnesium chloride, aluminum chloride, lithium chloride, and potassium chloride, among other chloride salts. Salt may also include ammonium sulfate, calcium acetate, calcium magnesium acetate, ice phobic coatings, magnesium acetate, potassium acetate, potassium carbonate, potassium bicarbonate, potassium phosphate, sodium formate, sodium nitrate, sodium sulfate, tetrapotassium pyrophosphate, and urea. The term "salt" is also understood to cover combinations of two or more different salts. Salt may include solids, as well as aqueous salt solutions (i.e., brines).

Salts may have a wide range of concentrations in the compositions of the invention. In some embodiments the salt concentration may range from about 5% to about 90%, by weight, of the composition. Other ranges for the salt concentration may include, but are not limited to, about 15 to about 70%, about 15% to about 60%, and about 30% to about 70%.

D. Water

The water useful in this invention is water as broadly known. Any source or type of water currently used by highway authorities is useful. The water can come from almost any source. The water used itself may contain small amounts of other ingredients including small amounts of salt to prevent its freezing. The concentration of water in the present deicing compositions may be from about 10% to about 98%, by wt., of the total composition.

E. Other Components

The compositions of the present invention may optionally include other components in addition to starch, salt and water. These components include a corrosion inhibitor that inhibits the rusting and/or corrosion of vehicle parts exposed to the composition. Corrosion inhibitors may include any commercially available inhibitors such as sodium citrate. When a corrosion inhibitor is added to the composition, it typically has a concentration of about 0.05% to about 2%, by weight.

Other components may also include abrasives and other friction enhancers, such as rocks, gravel, sand, cinders, rock salt, and ground glass, among other materials.

Other components may also include biocides that prevent bacteria an other organisms from altering or consuming a substantial amount of the composition in storage.

While not necessary, embodiments of the compositions may also include sugars and other kinds of carbohydrates. The sugars may include dextrose, maltose, malt-triose and higher saccharides of the kinds described in U.S. Pat. No. 6,468,442, to Bytnar, titled "DE-ICING COMPOSITION AND METHOD", the entire contents of which are hereby incorporated by reference for all purposes.

F. Experimental

Experiment 1:

A starch slurry was formed by adding 10 grams of pearl corn starch to 190 grams of water. The slurry was heated to 190° F. for 15 minutes to gelatinize the starch granules. The slurry was then added to a 30%, wt., aqueous $MgCl_2$ solution in the ratio of 90% $MgCl_2$ solution to 10% starch slurry. After steady mixing with minor agitation, the resulting mixture was 27% $MgCl_2$, and 0.5% starch, with the remainder of the mixture (72.5%) being water.

Measurements were then taken of the freezing point of water with mixture concentrations of 100%, 75%, 50% and 25% in water. The freezing points were compared with equivalent dilution ratios of a 27% $MgCl_2$ solution, and another de-icing composition of water, $MgCl_2$ and sugars. The results are displayed in Table 1, which refers to mixture prepared above as Formula 1.

TABLE 1

Comparison of Freezing Points for De-Icing Compositions

| Concentration | 27% $MgCl_2$ Solution | $MgCl_2$ + sugars | Formula 1 |
|---|---|---|---|
| 100% | −3° F. | −85° F. | −62° F. |
| 75% | −17° F. | −14° F. | −22° F. |
| 50% | 8° F. | 12° F. | −2° F. |
| 25% | 24° F. | 25° F. | 22° F. |

The data show that at all concentrations Formula 1 had lower freezing points for aqueous solutions than an unmodified 27% $MgCl_2$ solution. Unexpectedly, Formula 1 also showed an enhanced freezing point depression compared with a mixture of $MgCl_2$ and sugars at the 75%, 50% and 25% concentration levels. This means less of the de-icing composition of Formula 1 may be used to lower the freezing point an equivalent compared with a de-icer made from $MgCl_2$ and sugars. Consequently, the de-icing composition of Formula 1 is less costly and less polluting than the $MgCl_2$/sugars composition.

Experiment 2:

Freezing point measurements were made of mixtures made by adding powdered starch directly to an aqueous 30%, by weight, $MgCl_2$ solution. The powdered starch component was a modified dent corn starch sold under the tradename ICB® 3000D by A E Staley Manufacturing Co. of Decatur, Ill. Comparative measurements were also made with aqueous 18%, by wt., $MgCl_2$ solutions. Table 2 compares the freezing points of compositions with starch concentrations of 1.0%, 0.5% and 0.2%, by wt., mixed with the aqueous 30% $MgCl_2$ solution.

TABLE 2

Comparison of Freezing Points for Various Starch Concentrations

| Starch Concentration in aqueous 30% $MgCl_2$ solution | Freezing Point of Composition | Freezing Point of Composition with 18% $MgCl_2$ solution |
|---|---|---|
| 1.0% | −52° F. | −7° F. |
| 0.5% | −60° F. | −11° F. |
| 0.2% | −70° F. | −19° F. |

The data show, surprisingly, that compositions with lower starch concentrations have better freezing point depression characteristics.

Experiment 3

Comparative measurements were made of the viscosity of compositions of the invention with pure aqueous 30% $MgCl_2$ solutions, and mixtures of aqueous $MgCl_2$ with sugars. The compositions of the invention included 0.2%, by wt., ICB® 3000D starch combined with an aqueous 30%, by wt., $MgCl_2$ solution. Table 3 shows the viscosity data for the three compositions at various temperatures. The viscosity is measured in centipoises, which is 1/100th of a Poise, wherein 1 Poise=0.1 Pa×sec.

TABLE 3

De-icing Compositions Viscosity Data (Viscosity in Centipoise)

| | Viscosity | | |
|---|---|---|---|
| Temperature | Viscosity of Pure Aqueous 30% $MgCl_2$ Solution | Viscosity of $MgCl_2$ + sugars | Viscosity of $MgCl_2$ + 0.2% Starch |
| 0° F. | 20 | 115 | 26 |
| 20° F. | 18 | 60 | 22 |
| 40° F. | 13 | 40 | 15 |
| 60° F. | 8 | 20 | 9 |

The comparative data showed the viscosity of the present de-icing composition were much closer to the aqueous salt solutions than deicing compositions that added sugars. At lower temperatures, where the de-icing compounds are more likely to be used, the difference in viscosity was most pronounced. The low viscosities of the present compositions at low temperatures (e.g., less than 32° F.) reduce sliding and skidding hazards that arise when the compounds are applied to roads, walkways, and other outdoor surfaces.

Experiment 4

In this experiment, the freezing points of three de-icing compositions were measured at various aqueous dilution levels. The compositions were made from an aqueous 30%, by wt., $MgCl_2$ solution that contained 0.3%, 0.2%, and 0.1%, respectively, of ICB®3000D starch. The de-icing compositions were then incrementally diluted with water to lower the $MgCl_2$ concentration from 30% to 4% by 1% increments. The freezing points of the compositions were measured at each increment, and the results recorded in Table 4 below.

TABLE 4

Freezing Point (° F.) of Incrementally Diluted De-Icing Compositions

| % $MgCl_2$ in Solution | Freezing Point (° F.) 0.3% Starch Composition | Freezing Point (° F.) 0.2% Starch Composition | Freezing Point (° F.) 0.1% Starch Composition |
|---|---|---|---|
| 30 | −72 | −70 | −55 |
| 29 | −70 | −72 | −60 |
| 28 | −68 | −74 | −65 |
| 27 | −65 | −76 | −70 |
| 26 | −62 | −77 | −73 |
| 25 | −57 | −69 | −65 |
| 24 | −52 | −61 | −53 |
| 23 | −47 | −53 | −40 |
| 22 | −42 | −45 | −32 |
| 21 | −36 | −38 | −27 |
| 20 | −30 | −32 | −21 |
| 19 | −24 | −26 | −15 |
| 18 | −17 | −19 | −12 |
| 17 | −12 | −15 | −8 |
| 16 | −7 | −12 | −3 |
| 15 | −4 | −8 | 1 |
| 14 | 0 | −5 | 5 |
| 13 | 4 | 0 | 8 |
| 12 | 6 | 4 | 11 |
| 11 | 8 | 9 | 14 |
| 10 | 10 | 14 | 16 |
| 9 | 14 | 17 | 19 |
| 8 | 17 | 20 | 21 |
| 7 | 20 | 22 | 23 |
| 6 | 24 | 24 | 25 |
| 5 | 27 | 26 | 27 |
| 4 | 29 | 28 | 29 |

The freezing point measurements of the three compositions were plotted in FIG. 1, which shows a freezing point plot for the three compositions, as well as a pure aqueous $MgCl_2$ solution, and a de-icing composition made of aqueous $MgCl_2$ and sugars (M1000). The plot shows that over a wide range of temperatures the $MgCl_2$ and starch compositions of the present invention had lower freezing points than pure aqueous $MgCl_2$ solutions, and aqueous $MgCl_2$ and sugars over a wide dilution range.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, acts, steps, or groups.

What is claimed is:

1. A deicing composition to reduce ice buildup on a surface, the composition comprising salt, water, and a modified starch, wherein the modified starch has a concentration from 0.1% to 0.3%, by wt., and wherein the modified starch is selected to provide the composition with a viscosity of about 60 centipoise or less at 0° F.

2. The composition of claim 1, wherein the viscosity is about 30 centipoise or less at 0° F.

3. The composition of claim 1, wherein the viscosity of the composition is about 90% or more of a viscosity for an aqueous solution of the salt and water without the modified starch.

4. The composition of claim 1, wherein the composition is substantially free of sugars.

5. The composition of claim 1, wherein the composition comprises a corrosion inhibitor.

6. The composition of claim 5, wherein the corrosion inhibitor comprises sodium citrate.

7. The composition of claim 1, wherein the composition contains a biocide.

8. The composition of claim 1, wherein the salt is selected from the group consisting of sodium chloride, calcium chloride, magnesium chloride, aluminum chloride, ammonium sulfate, calcium acetate, calcium magnesium acetate, ice phobic coatings, lithium chloride, magnesium acetate, potassium acetate, potassium carbonate, potassium bicarbonate, potassium chloride, potassium phosphate, sodium formate, sodium nitrate, sodium sulfate, tetrapotassium pyrophosphate, urea, and combinations of these salts.

9. The composition of claim 1, wherein the modified starch is selected from the group consisting of starch-based polymers, cross-linked starches, substituted starches, phosphated starches, oxidized starches, acid-thinned starches, and combinations of these starches.

10. The composition of claim 1, wherein the modified starch has a molecular weight of about 5000 grams/mole or more.

11. The composition of claim 1, wherein the composition comprises an additive.

12. The composition of claim 11, wherein the additive is selected from the group consisting of sand, gravel, cinders, abrasives, and combinations of these additives.

13. A deicing composition to enhance deicing capabilities on a roadway, the composition comprising:
    about 10% to about 98%, by weight, water
    0.1% to 0.3%, by weight, modified starch; and
    about 5% to about 90%, by weight, salt,
    wherein the modified starch is selected to provide the composition with a viscosity of about 60 centipoise or less at 0° F.

14. The composition of claim 13, wherein the salt is selected from the group consisting of sodium chloride, calcium chloride, magnesium chloride, aluminum chloride, ammonium sulfate, calcium acetate, calcium magnesium acetate, ice phobic coatings, lithium chloride, magnesium acetate, potassium acetate, potassium carbonate, potassium bicarbonate, potassium chloride, potassium phosphate, sodium formate, sodium nitrate, sodium sulfate, tetrapotassium pyrophosphate, urea, and combinations of these salts.

15. A deicing composition comprising salt, water, and gelatin, wherein the gelatin comprises 0.1% to 0.3%, by weight, of the deicing composition, and wherein the gelatin is selected to provide the composition with a viscosity of about 60 centipoise or less at 0° F.

* * * * *